Aug. 24, 1943.  C. B. SHILLINGER  2,327,673
MACHINE FOR MAKING GLASS ARTICLES
Filed July 29, 1939  15 Sheets-Sheet 1

C. B. Shillinger
INVENTOR.

BY Rule & Hoge,
ATTORNEYS.

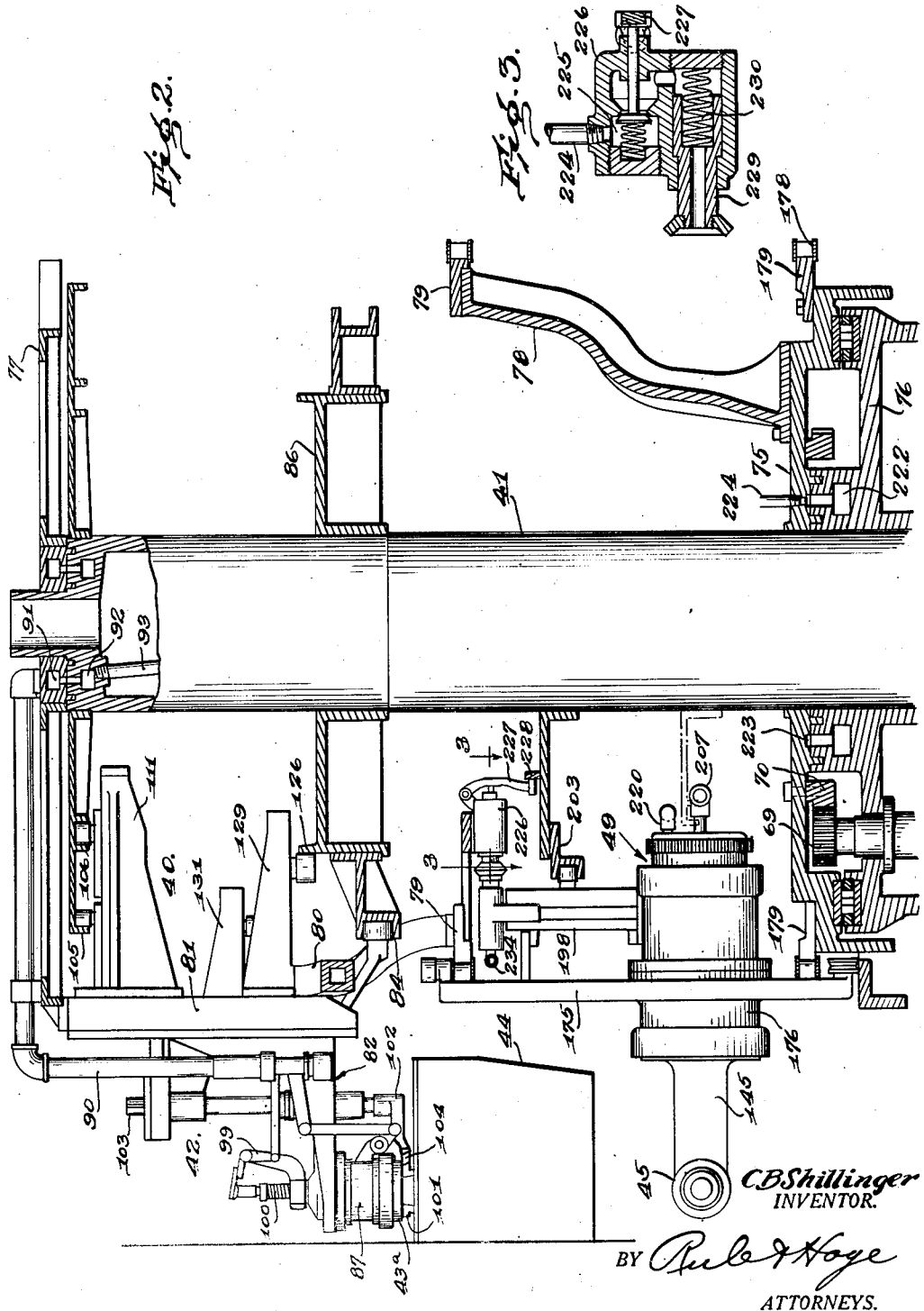

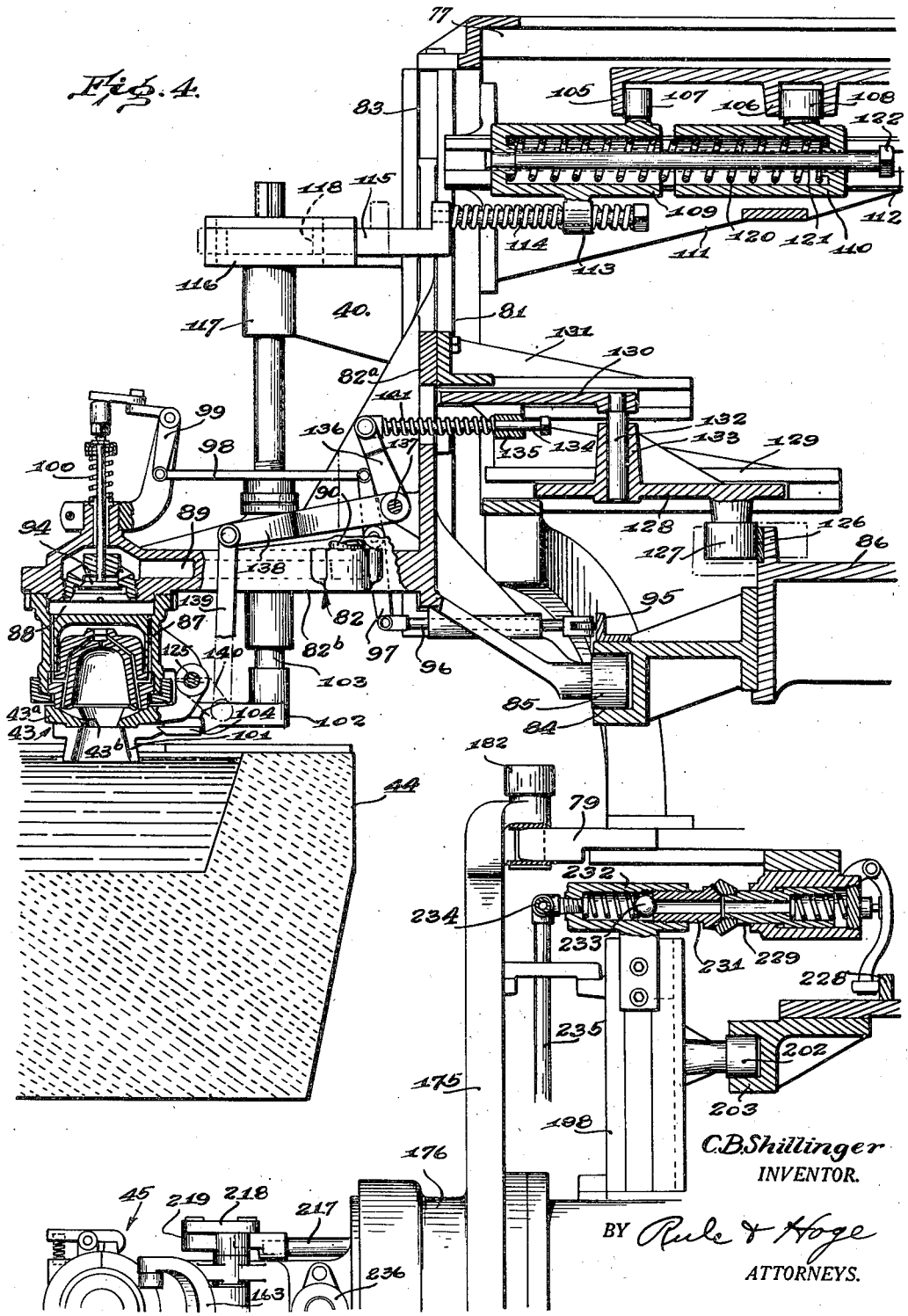

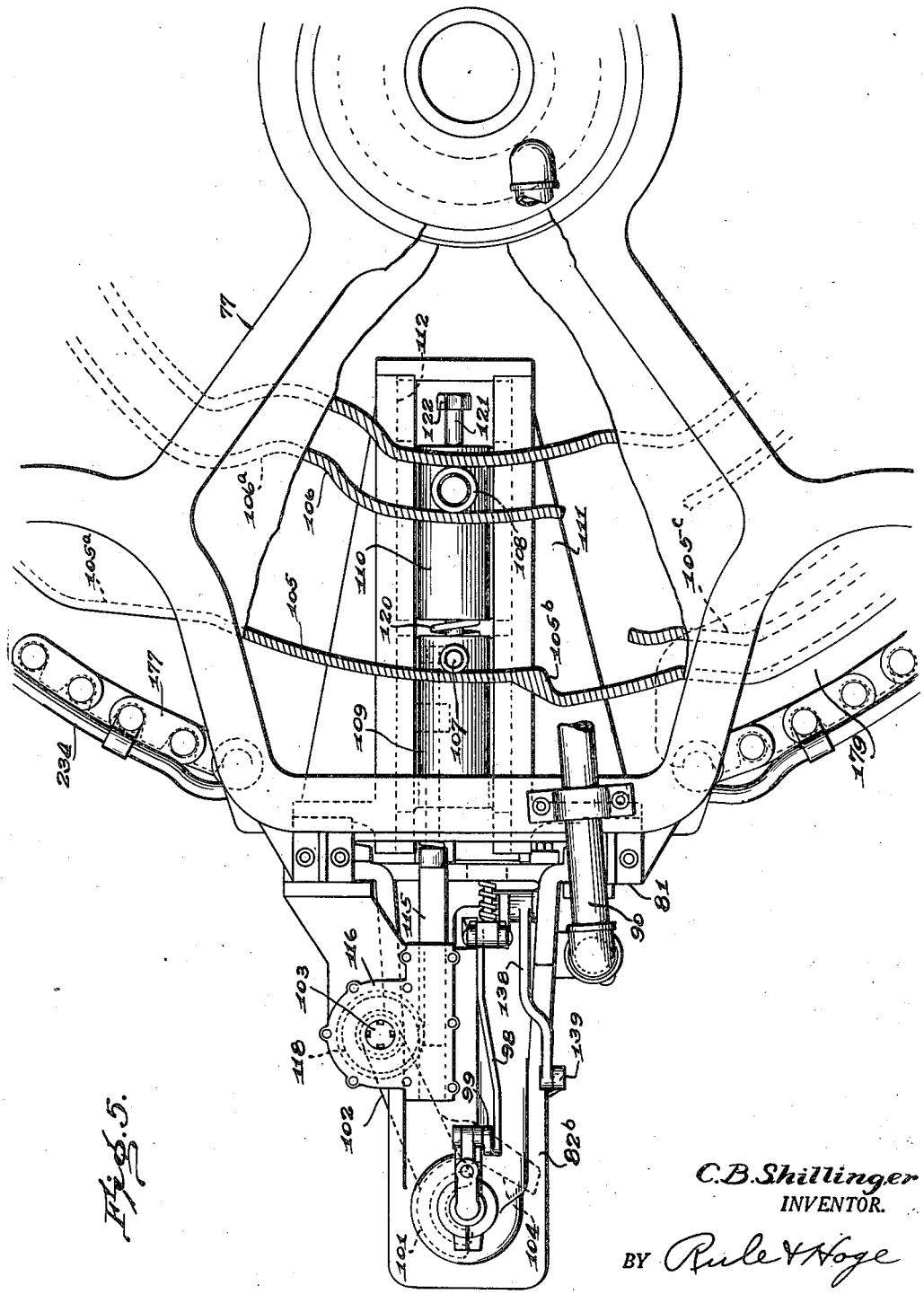

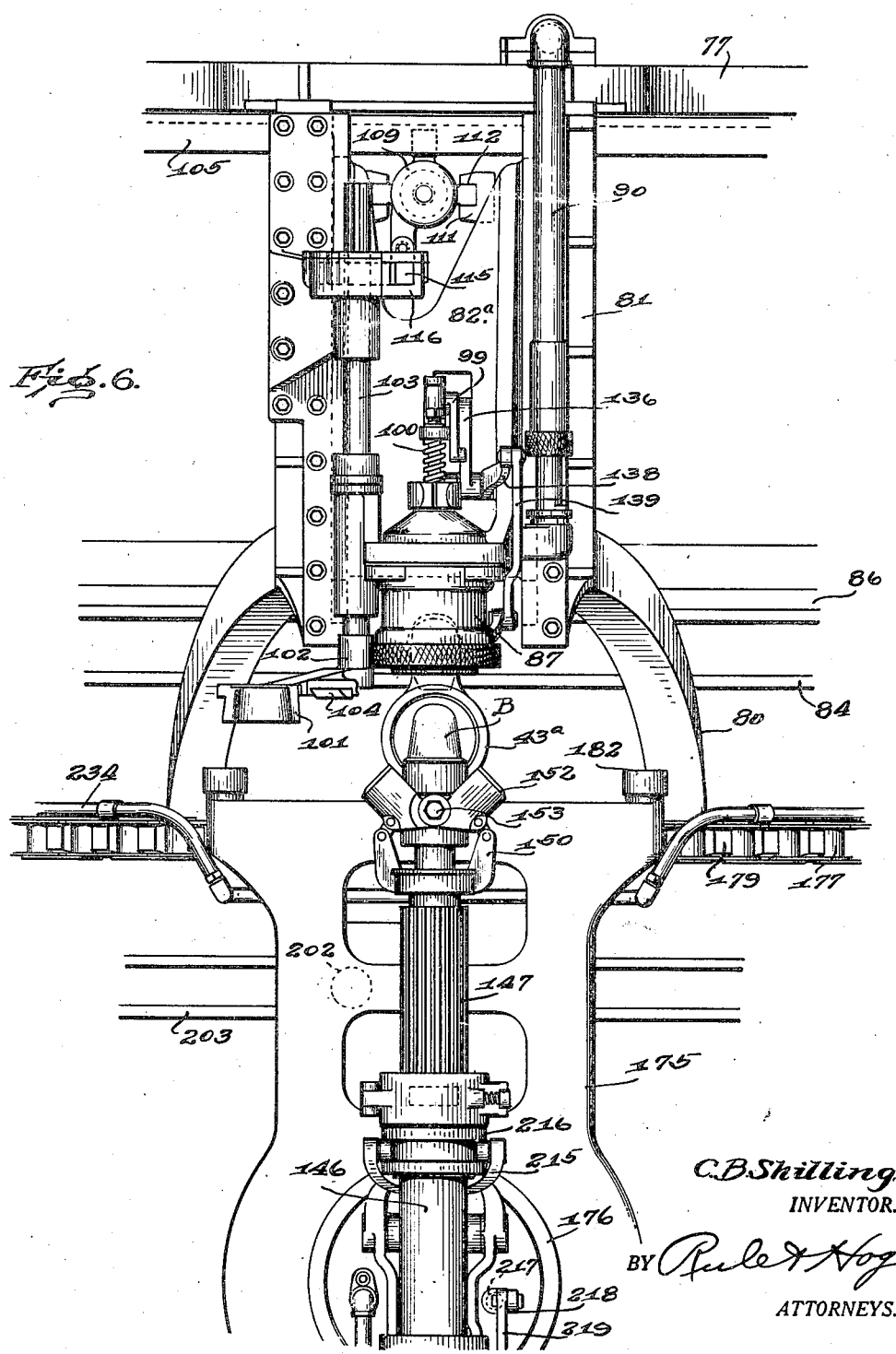

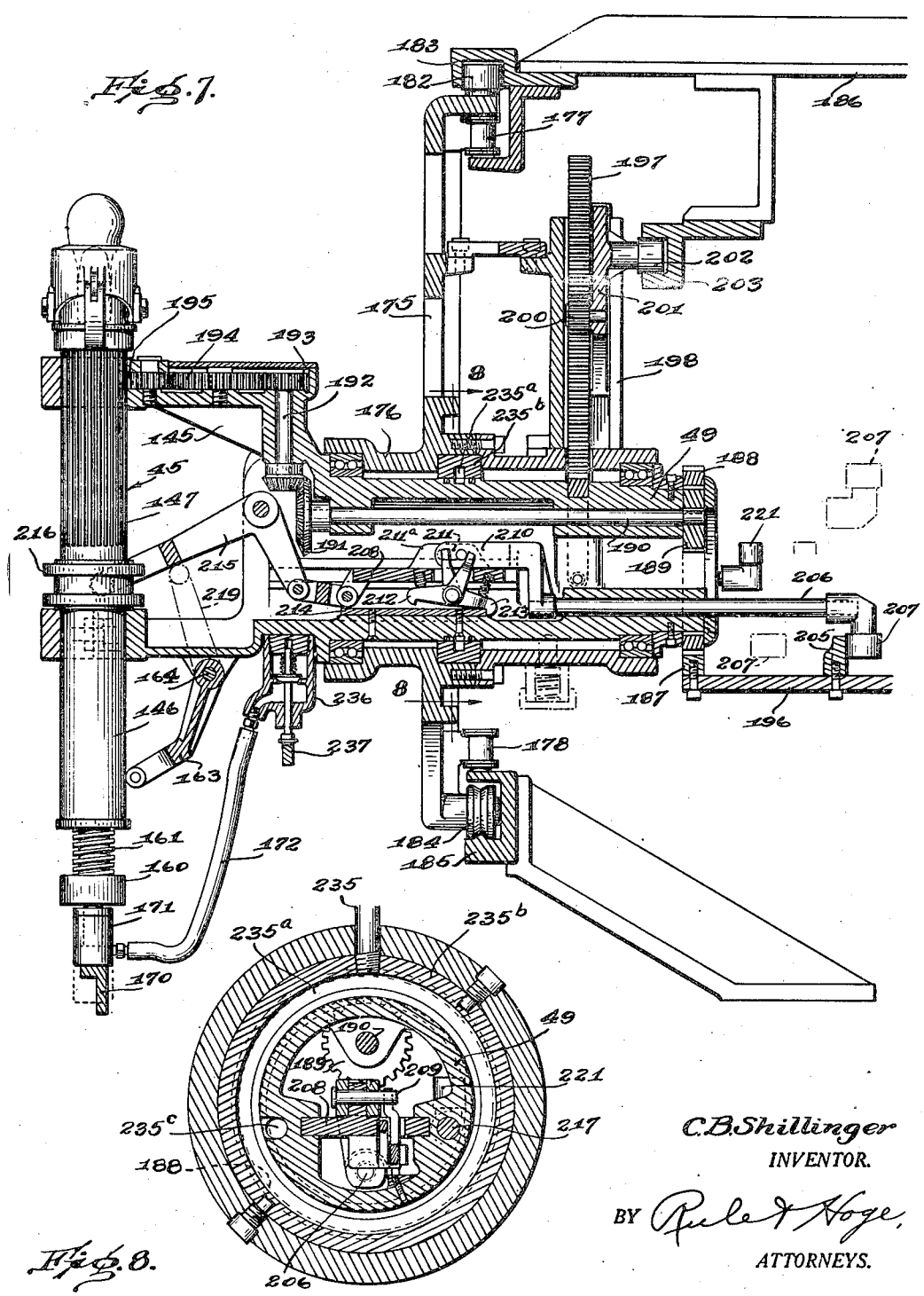

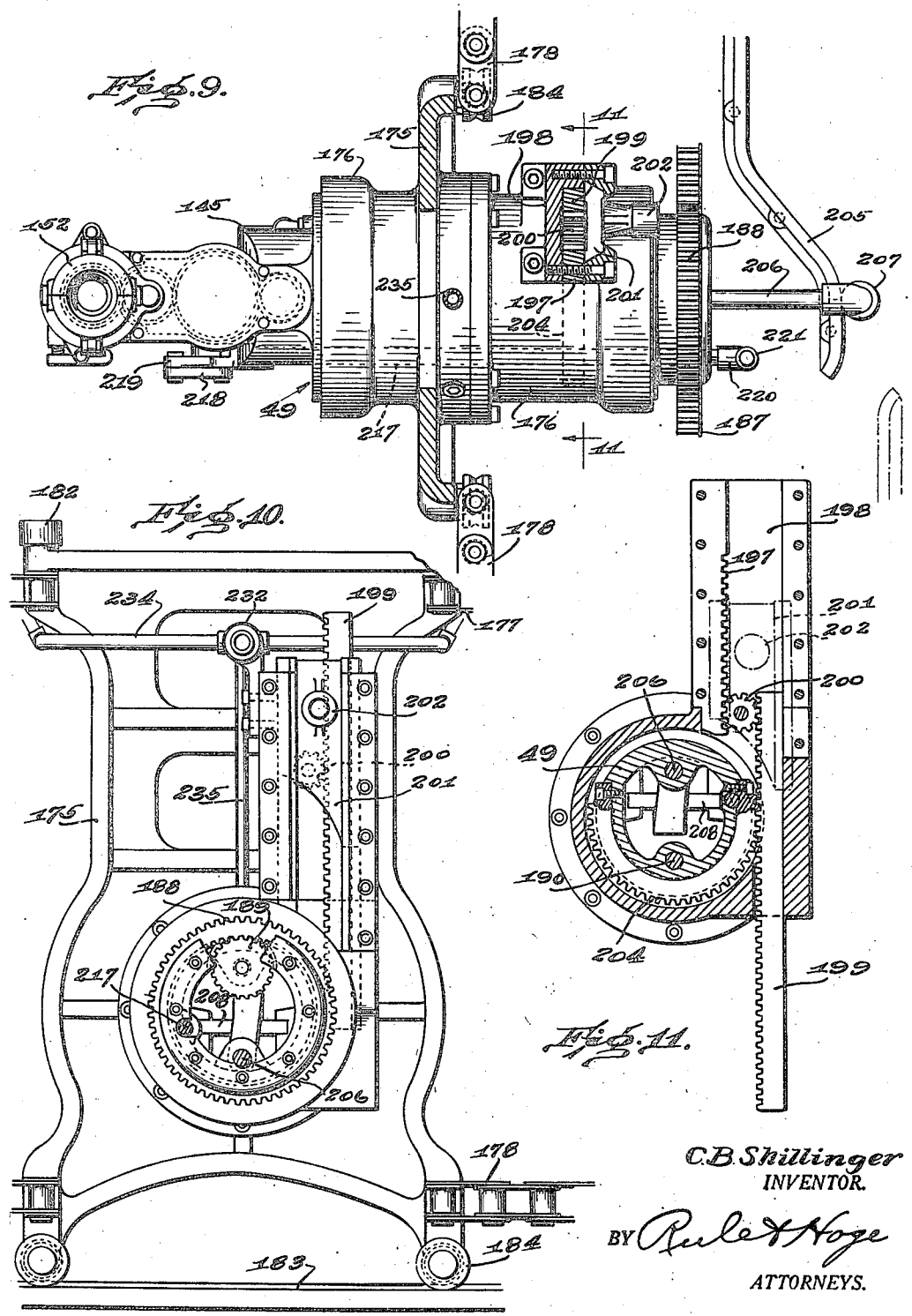

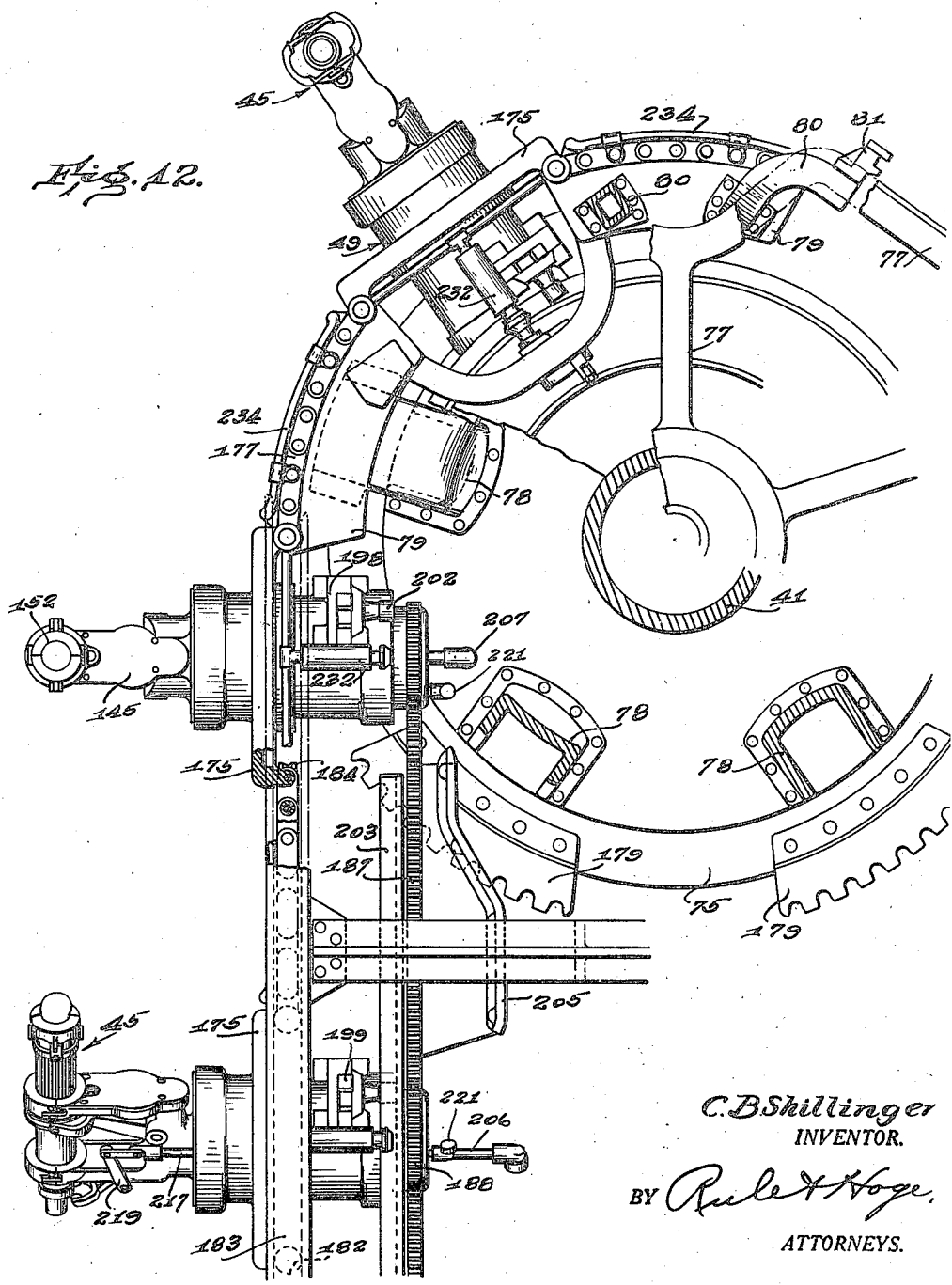

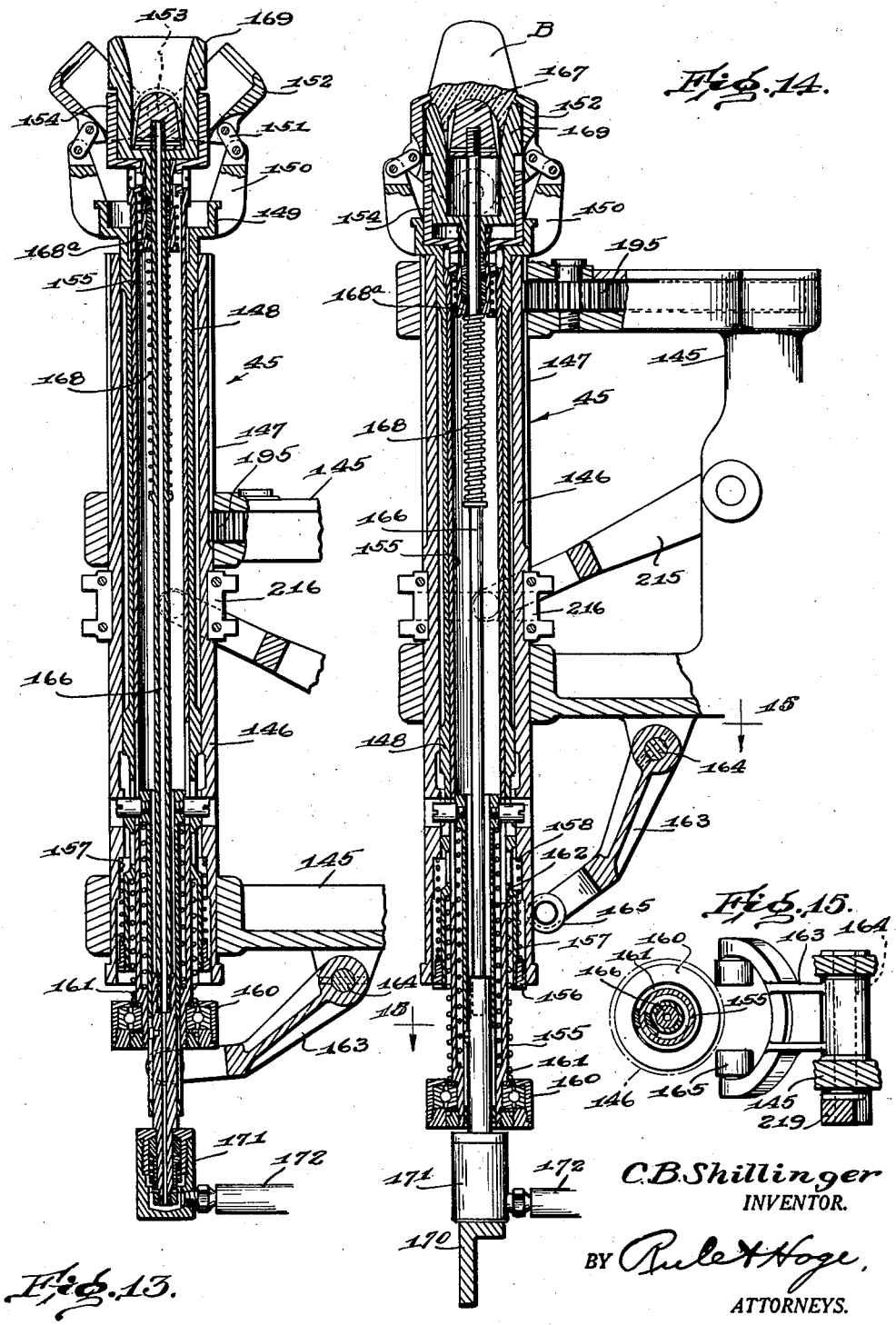

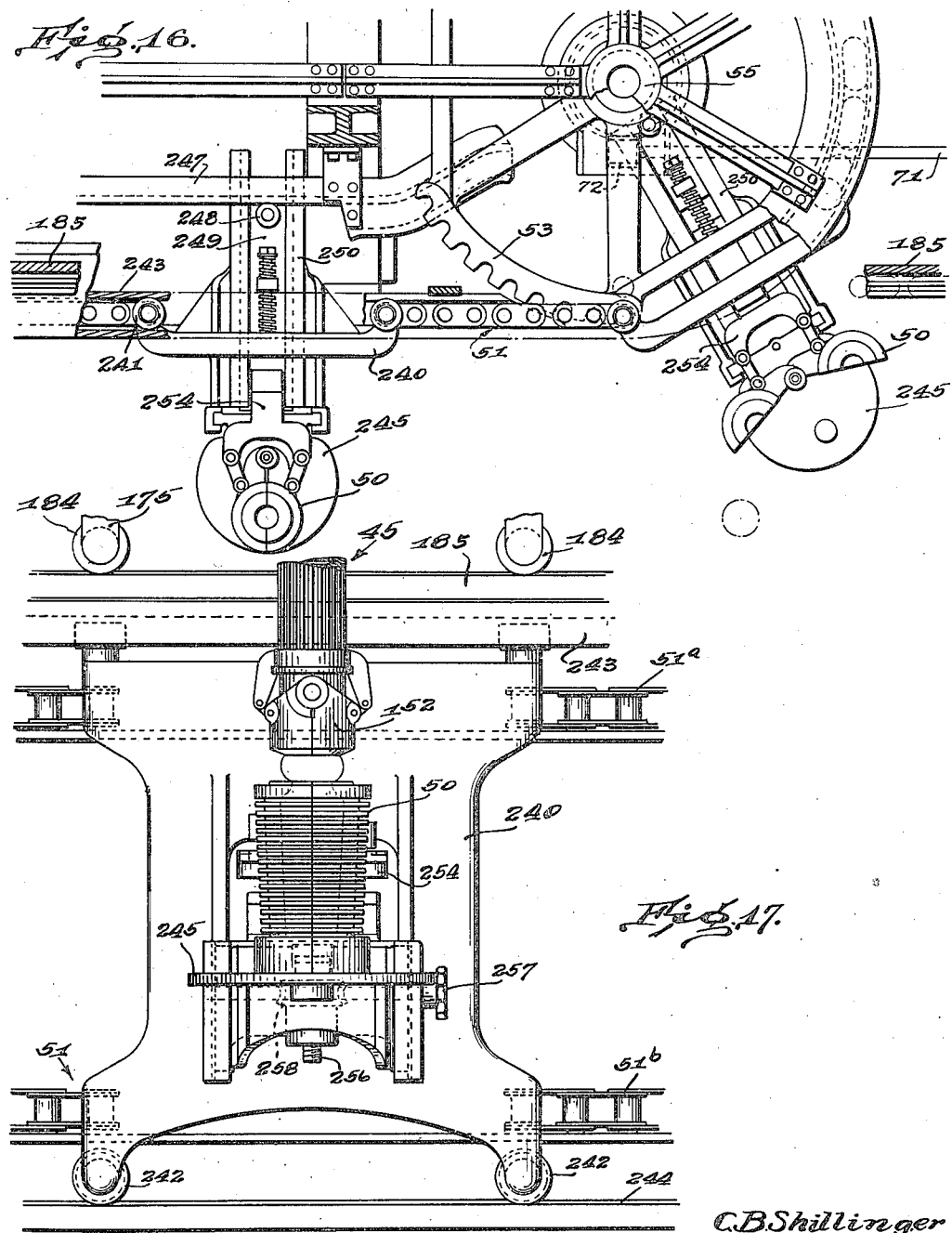

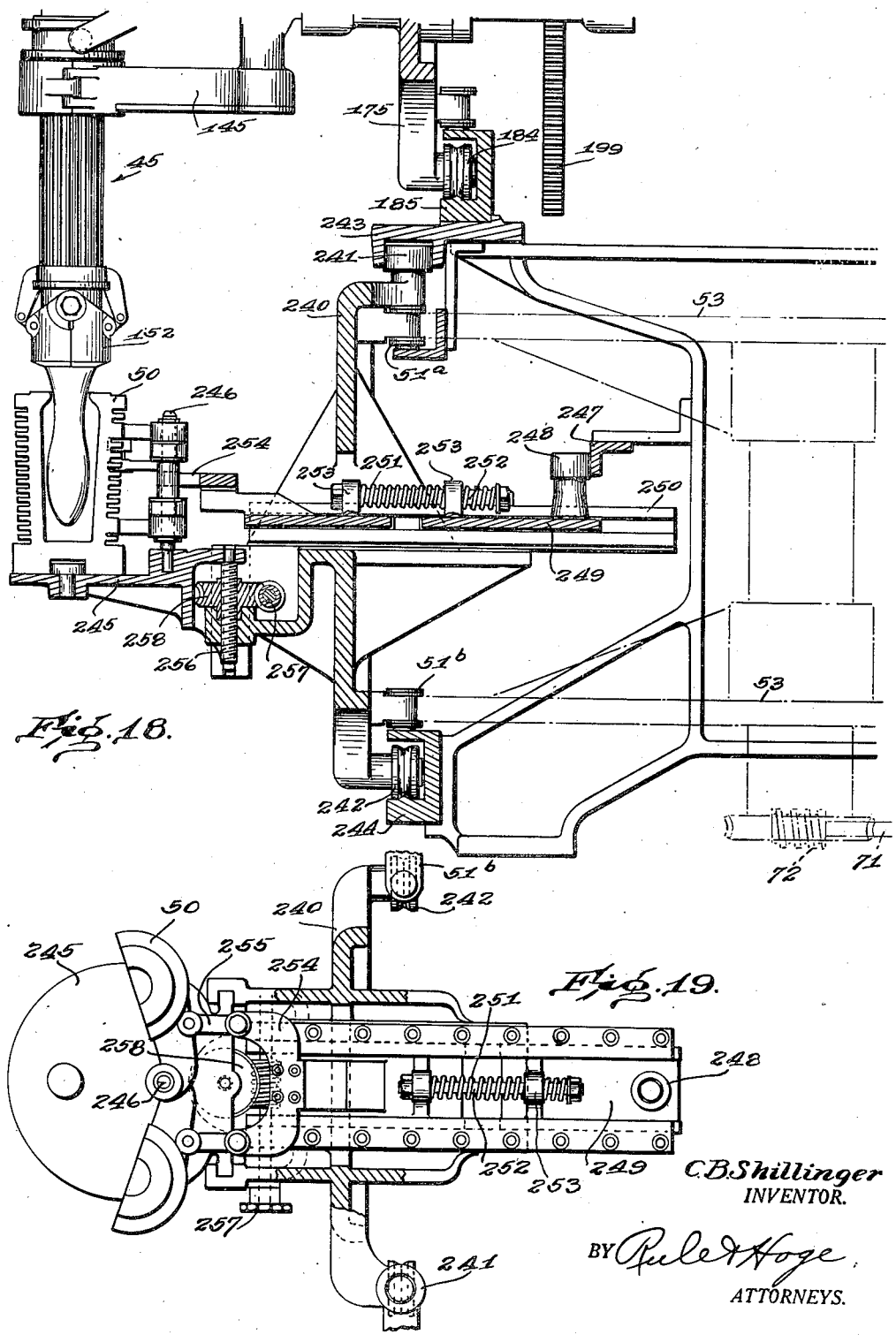

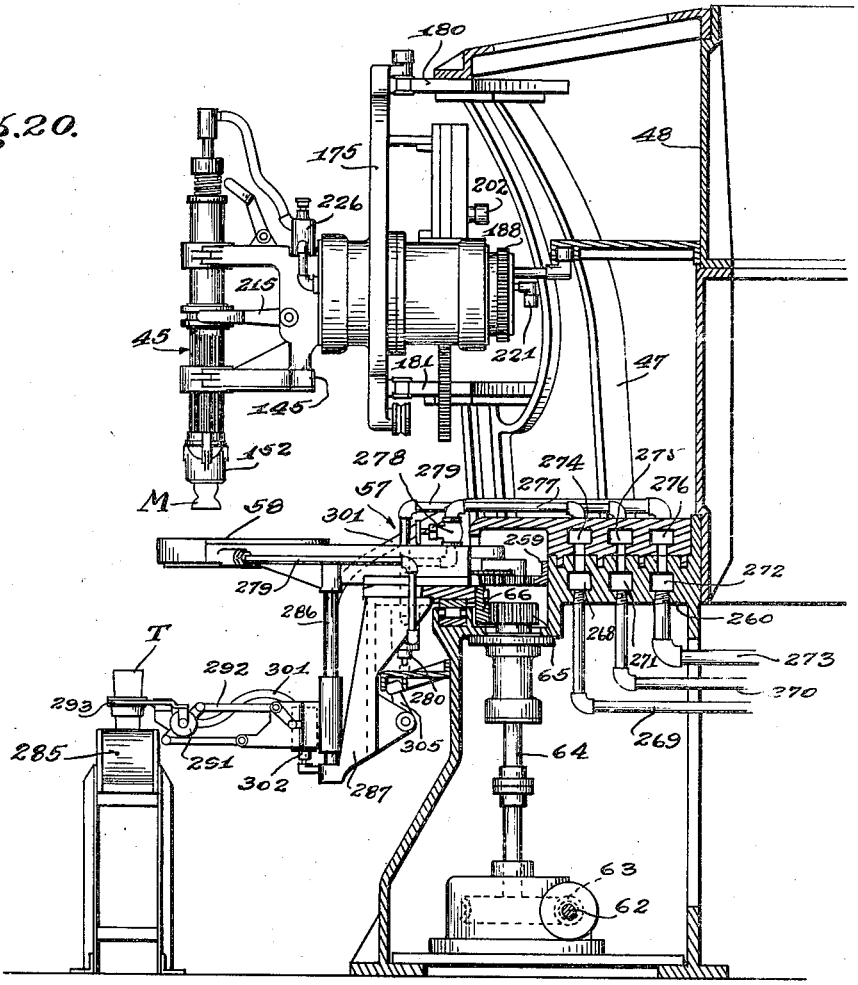

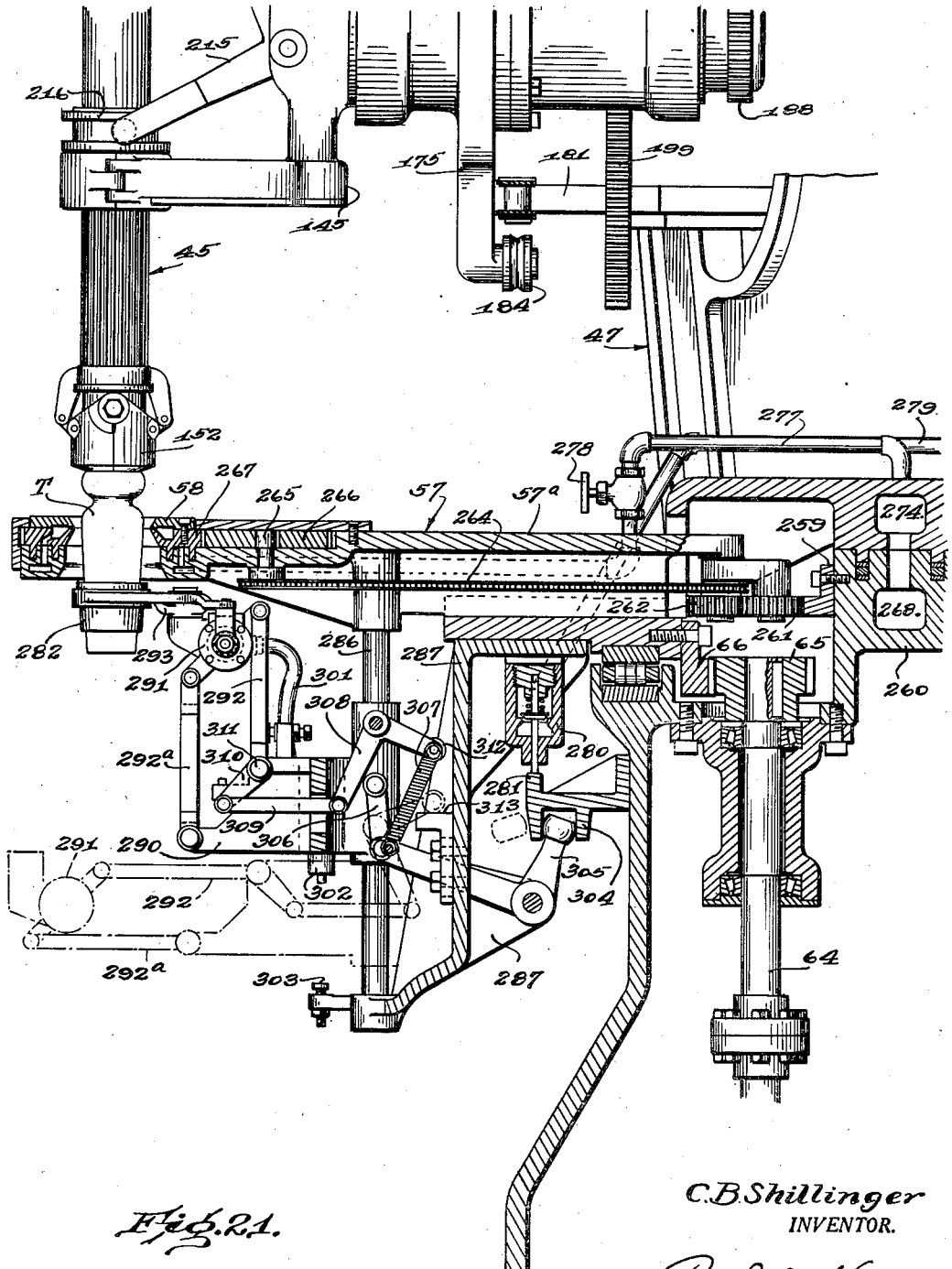

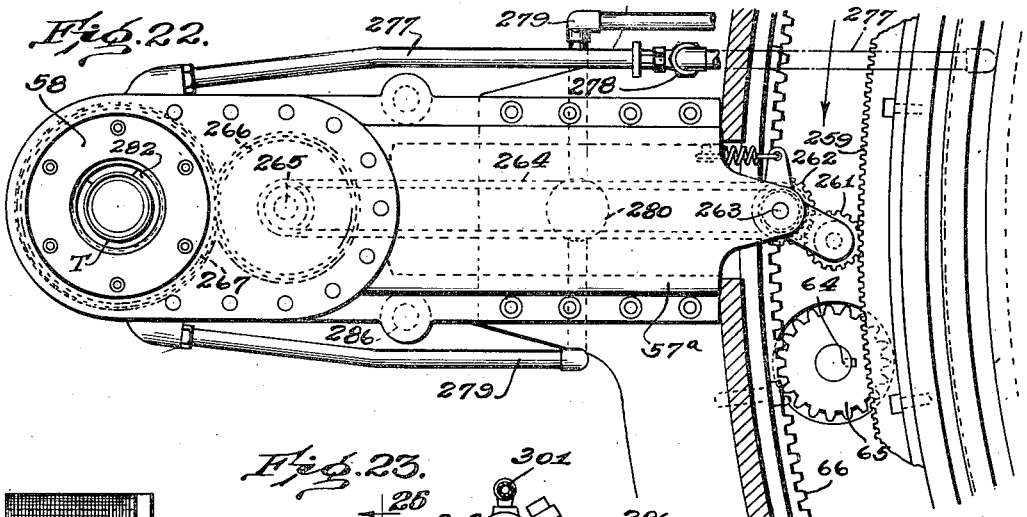
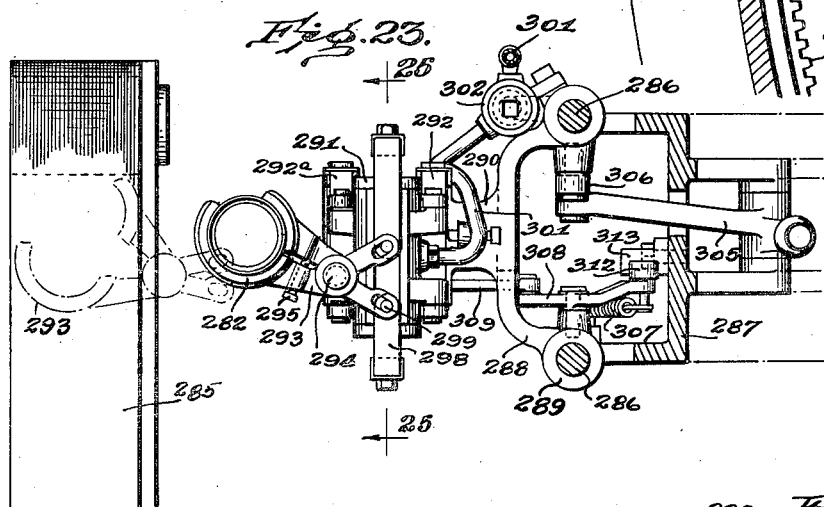
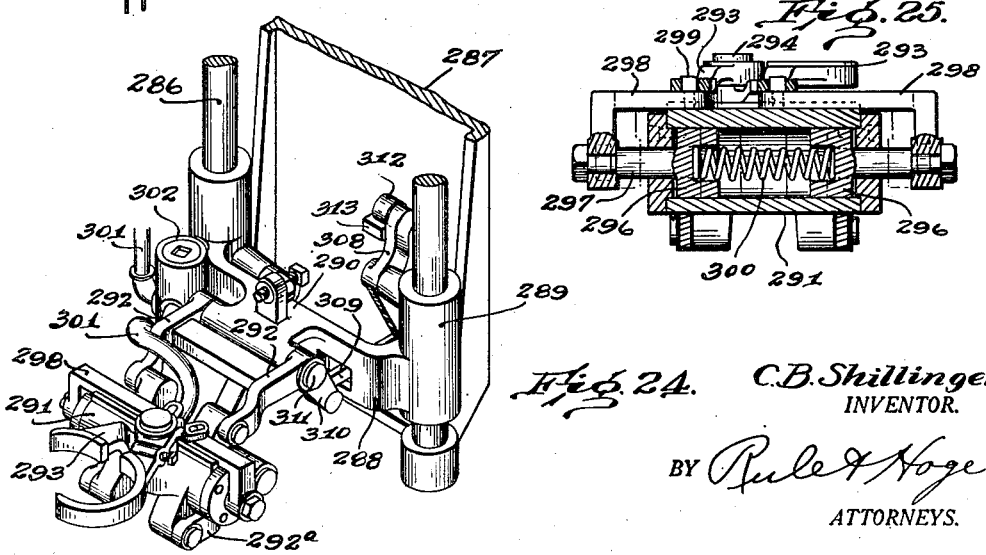

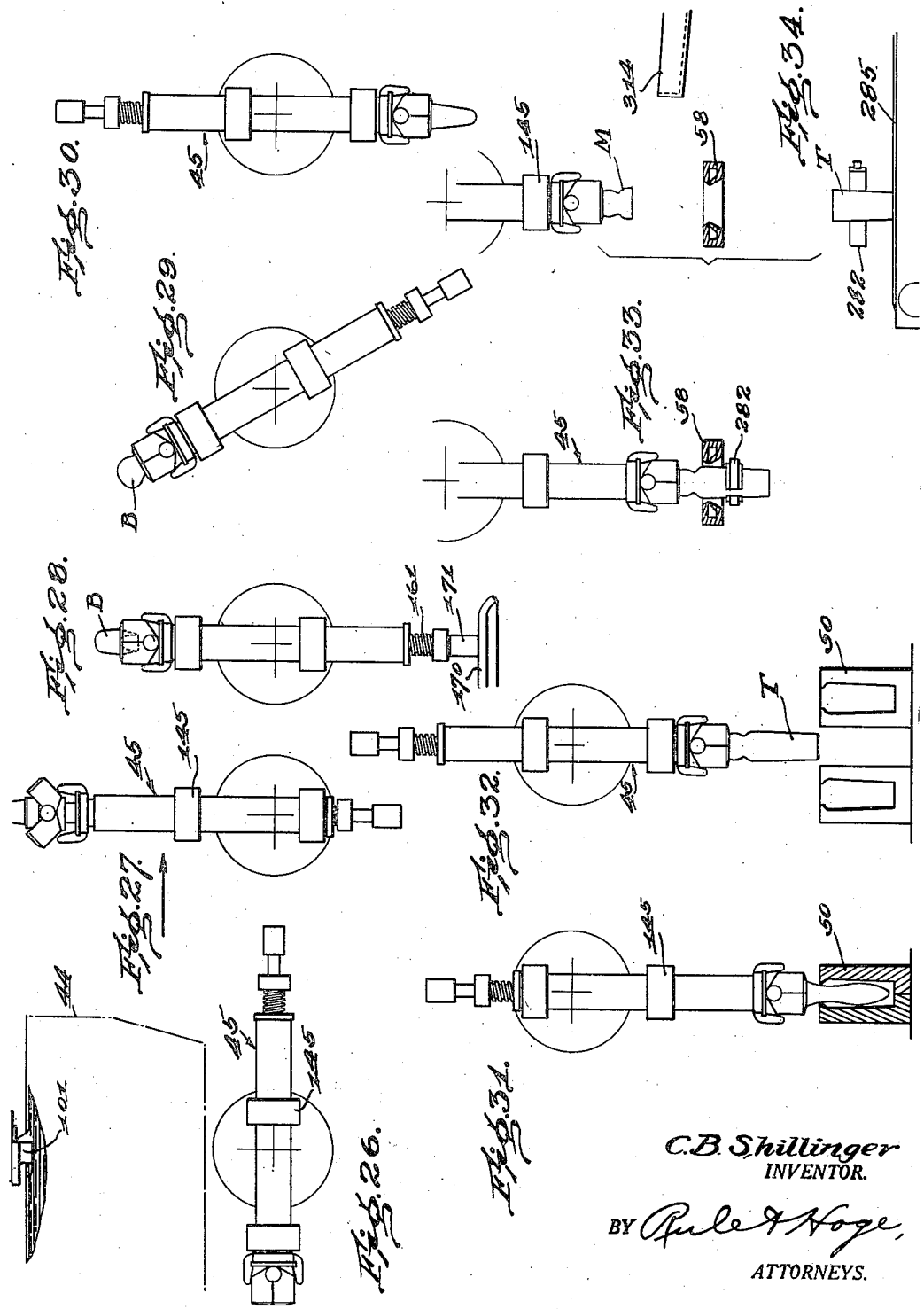

Patented Aug. 24, 1943

2,327,673

UNITED STATES PATENT OFFICE 2,327,673

MACHINE FOR MAKING GLASS ARTICLES

Clare B. Shillinger, Toledo, Ohio, assignor to Owens-Illinois Glass Company, a corporation of Ohio Application July 29, 1939, Serial No. 287,353

29 Claims. (Cl. 49—5)

My invention relates to apparatus for making tumblers and other hollow glassware. In its preferred form it comprises a machine of the suction gathering type including a rotary mold carriage having mounted thereon blank molds which gather charges of glass by suction, a chain type spindle conveyor carrying spindles to which the blanks are delivered directly from the blank molds, a chain type blow mold carrier and blow molds thereon which travel with the spindles while the blanks are blown therein to finished form, burn-off mechanism for severing the blown articles from the moil, and means for transferring the several articles to a conveyor.

An object of the invention is to provide a machine of the type indicated which is comparatively simple in construction, efficient in operation, and having a high rate of production of high quality ware.

A feature of the invention relates to the novel combination and arrangement of the mold carriage and the spindle conveyor traveling about the axis of the mold carriage with the spindles brought into register in succession with the molds for receiving the blanks.

A further feature of the invention relates to the provision of a novel type of combined plow and cut-off cooperating with the gathering mold.

A further object of the invention is to provide a novel form of mechanism for inverting and re-inverting the spindles and novel means for rotating the spindles.

A further object of the invention is to provide new and efficient burner mechanism cooperating with the spindles for burning off the moil and particularly a novel combination and arrangement by which the blown tumblers or other articles may be severed from the moil before the blown ware has been detached from the spindle and while in an upright position.

A further object of the invention is to provide a novel and efficient mechanism for transferring the ware from the burners to a conveyor while the ware is retained in its upright position.

Other objects of the invention will appear hereinafter.

Referring to the accompanying drawings which illustrate a preferred form of apparatus embodying the principles of my invention:

Fig. 2 is a part sectional elevation showing the blank mold carriage with a mold in dip and a spindle unit;

Fig. 3 is a sectional detail of valve mechanism controlling the air supply to the spindles, the section being taken at the line 3—3 on Fig. 2;

Fig. 4 is a fragmentary sectional elevation of a gathering unit and associated parts, showing the position of the parts just prior to gathering the blank by suction;

Fig. 5 is a part sectional plan view of a gathering unit and showing particularly the cams and cam actuated mechanism for operating the cut-off;

Fig. 6 is a front elevation of a gathering head and a spindle in position to receive the blank;

Fig. 7 is a sectional elevation illustrating a spindle unit;

Fig. 8 is a vertical section through the spindle inverting drum, the section being taken at the line 8—8 on Fig. 7;

Fig. 9 is a part sectional plan view of a spindle unit;

Fig. 10 is a rear elevation of the spindle unit;

Fig. 11 is a section at the line 11—11 on Fig. 9 showing a spindle inverting mechanism;

Fig. 12 is a part sectional plan view showing a portion of the spindle conveyor and the gathering mold carriage;

Fig. 13 is a sectional elevation of a spindle in charge-receiving position;

Fig. 14 is a section of the spindle after it has received its charge and with the plunger projected;

Fig. 15 is a section at the line 15—15 on Fig. 14;

Fig. 16 is a fragmentary plan view of a portion of the finishing mold conveyor, finishing mold units and means for driving the conveyor;

Fig. 17 is a front elevation of a finishing mold unit;

Fig. 18 is a vertical section of a finishing mold unit and of a spindle cooperating therewith;

Fig. 19 is a sectional plan view of the finishing mold unit;

Fig. 20 is a fragmentary sectional elevation of the burn-off carriage, transfer mechanism, and a spindle unit;

Fig. 21 is a vertical sectional view on a larger scale of mechanism shown in Fig. 20, the parts being in the position assumed during the burning operation;

Fig. 22 is a plan view of a burner unit;

Fig. 23 is a sectional plan view of the ware transfer mechanism;

Fig. 24 is a perspective view showing the transfer arm in its lowered position;

Fig. 25 is a section at the line 25—25 on Fig. 23, showing the piston motor for opening the ware-holding jaws;

Figure 1:
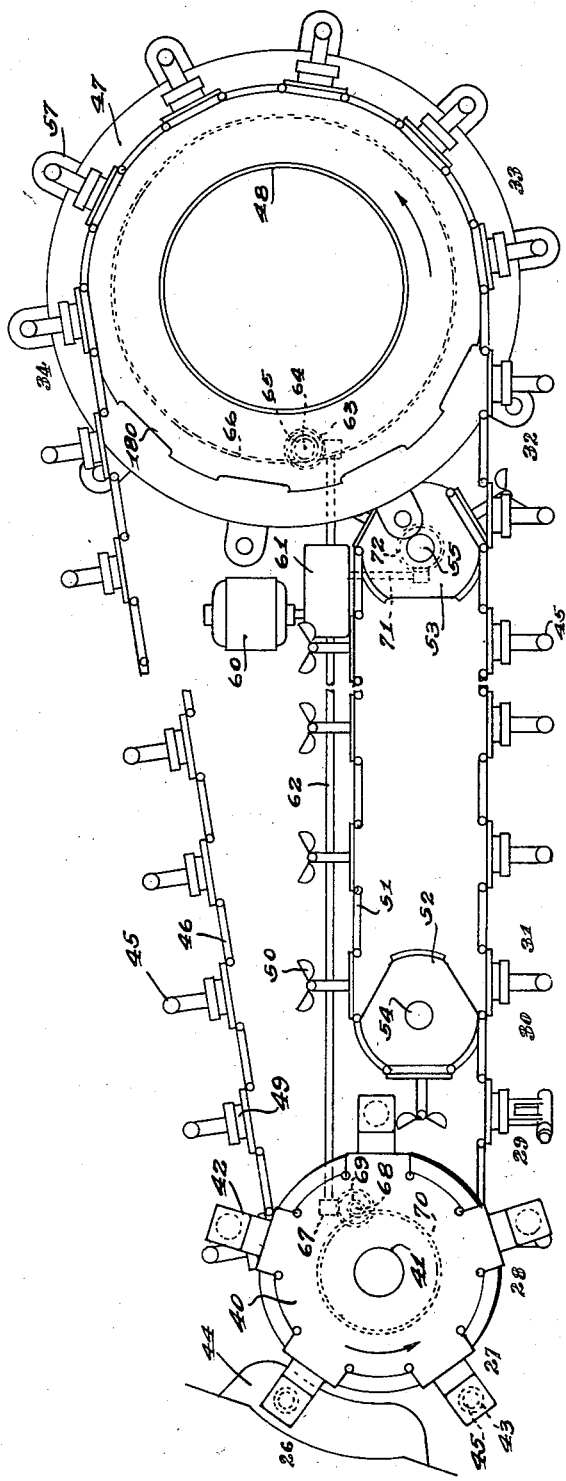
Fig. 1 is a diagrammatic plan view of the apparatus.

Figs. 26 to 34 inclusive are diagrammatic views of a spindle at successive steps in a cycle of operations as indicated by the correspondingly designated positions on Fig. 1;

Fig. 26 shows a spindle beneath the gathering pot during the gathering operation;

Fig. 27 shows the spindle receiving its charge;

Fig. 28 shows the spindle lowered with the blank gripping jaws closed and the plunger raised for forming the initial blow opening in the blank;

Fig. 29 shows the position assumed during the open-air development of the blank;

Fig. 30 shows the spindle in its inverted position;

Fig. 31 shows the spindle lowered and the blank enclosed in the finishing mold;

Fig. 32 shows the spindle with the blown article thereon lifted during its transfer to the burner;

Fig. 33 shows the spindle lowered to introduce the blown article into the burner; and Fig. 34 shows the position of parts after the burn-off operation is completed, the spindle with the attached moil being raised and the blown tumbler lowered onto the conveyor.

General construction

The general construction of the apparatus and arrangement of parts will be understood by reference to Fig. 1. A blank mold carriage 40 is mounted for continuous rotation about a stationary center column 41, the carriage having mounted thereon an annular series of gathering or blank mold units 42, each comprising a blank mold 43 and associated mechanism for actuating the mold. The rotation of the carriage brings the blank molds in succession over a gathering pot or forehearth 44 of a furnace and the molds gather their charges of glass by suction from the pool of molten glass in the forehearth.

A series of spindles 45 are carried on an endless chain conveyor 46 which is trained around the carriage 40 and a burn-off carriage 47, the latter mounted for continuous rotation about a stationary center column 48. The spindle conveyor and spindles travel continuously, the path of the spindles being below the level of the blank mold units. The carriages and conveyors are driven in a counter-clockwise direction. The spindles are carried on drums 49 having rotatable mounting, permitting the spindles to be rotated about horizontal axes for inverting and reinverting the spindles as hereinafter set forth. Each spindle as it approaches the gathering zone is swung to a horizontal position (Fig. 26) to permit it to pass beneath the forehearth 44. As it passes beyond the forehearth it is swung to an upright position beneath and in register with a blank mold 43 and a blank therein, permitting the blank to be transferred to the spindle.

Finishing mold units, each comprising a partible finishing mold 50 and its operating mechanism, are carried on an endless chain conveyor 51 trained over gears 52 and 53 mounted on vertical shafts 54 and 55 respectively. The molds 50 travel in a path below the spindles 45, the molds being brought in succession into register with the spindles while the latter are in an inverted position. Each finishing mold, as it is brought into register with a spindle, is closed around the partially developed blank suspended from the spindle (Fig. 18) and the blank is then blown to finished form in the mold.

The burn-off carriage 47 carries an annular series of burn-off units 57, each including a ring burner 58 (Figs. 21, 22), means for rotating the burner, and means for supplying gases to the burner. The spindles with the tumblers or other blown articles suspended therefrom are carried over the burners (Figs. 20 and 21), and each spindle lowered to position the article carried thereby within the burner where it is severed from the moil by the burn-off operation. The articles are then transferred automatically to a conveyor by transfer mechanism hereinafter described.

The carriages and chain conveyors are driven by an electric motor 60 (Fig. 1) which operates through speed reduction mechanism in a gear box 61, to rotate a drive shaft 62. The latter has a worm gear driving connection 63 with a vertical shaft 64 (Figs. 1 and 20) on the upper end of which is a driving pinion 65 running in mesh with an annular gear 66 on the carriage 47 for continuously driving the latter. The drive shaft 62 also has a driving connection through worm gearing 67 with a vertical shaft 68 on the upper end of which is a pinion 69 (Figs. 1 and 2) running on an annular gear 70 on the carriage 40 for continuously rotating the carriage. The blow mold conveyor 51 is driven through a train of gearing extending from the gear box 61 including a shaft 71 and worm gearing 72 (Figs. 1 and 18).

Blank mold mechanism

The blank mold carriage includes a lower plate or spider 75 (Fig. 2) supported on a base or casting 76 and rotating about the column 41. An upper spider 77, mounted for rotation on the upper end of the column 41, is connected to the lower plate 75 by a framework including a series of brackets 78 (see Figs. 2 and 12). On the upper ends of the brackets 78 are attached segmental sprocket plates 79 on which runs the upper sprocket chain of the spindle conveyor as hereinafter described. Mounted on the plates 79 are arched brackets 80 to the upper ends of which are attached the lower ends of pairs of vertically disposed guide rails 81 (Figs. 2, 4, 6) which support and guide the mold carrying dip frames as they move up and down on the carriage. The upper spider 77 is bolted to the upper end of the guide rails 81.

Each of the suction gathering blank molds 43 is mounted on a dip frame 82 comprising a vertical frame member or plate 82ª and a horizontal arm 82ᵇ extending radially outward therefrom and carrying the mold at its outer end. The frame member 82ª is mounted to slide in guideways 83 formed in the guide rails 81. The dip frame is moved up and down by means of a stationary cam track 84 (Figs. 2 and 4) on which runs a cam roll 85 carried on the dip frame. The track 84 is carried on a cam plate 86 mounted on the column 41.

Each blank mold 43 includes a hinged bottom plate 43ª (Fig. 4) provided with a fill opening 43ᵇ through which the glass enters the mold. The body of the mold is removably mounted in a casing 87 which provides a vacuum chamber 88 from which the air is exhausted for applying suction within the mold and thereby gathering charges of glass. The suction line extends from the vacuum chamber 88 through a passageway 89 in the arm 82ᵇ and a vacuum pipe 90 (Figs. 2 and 4) leading therefrom to an annular vacuum chamber 91 in the spider 77. The chamber 91 communicates with a vacuum chamber 92 in the column 41. The air is exhausted from the chamber 92 through a pipe 93 connected to any suitable air exhausting means. The application of suction within the mold is controlled by a valve 94 actuated by a stationary cam 95 (Fig. 4) operating through a train of gearing including a rod 96, lever 97, link 98, and bell crank 99. The cam operates through said train to depress the valve stem, thereby opening the valve. After the mold is charged, the cam roll runs off the cam 95 and a spring 100 closes the valve.

While the mold is gathering its charge by suction a plow 101 (Figs. 4, 5 and 6) is held in position between the mold bottom and pool of molten glass with the plow dipping into the glass. The plow is substantially semicircular and when in operative position is concentric with the mold, extending across the rear half of the bottom plate 43ª so as to form a downward extension of the wall of the mold cavity. As the mold traverses the pool of glass, the plow forces the glass upward so that it seals the bottom opening 43ᵇ.

The plow is carried at the outer end of a horizontal rock arm 102 attached to the lower end of a vertical rock shaft 103. A knife blade 104 is attached to the rock arm 102 in such position that when the arm is rocked to withdraw the plow, the knife shears across the lower end of the mold and severs the blank from the glass in the pool. The rock shaft 103, herein referred to as a knife shaft, is actuated by mechanism under the control of stationary cam tracks 105 and 106. Cam rolls 107 and 108 running respectively on cams 105 and 106, are carried on sections 109 and 110 respectively of a sectional slide mounted to reciprocate radially of the carriage. For this purpose the slide members 109, 110 are supported in bracket arms 111 formed with guideways 112. The slide member 109 is formed with a lug 113 through which extends a rod 114 connected to a rack bar 115. Coil springs mounted on the rod 114 provide a yielding connection between said rod and the slide 109. The rack bar 115 reciprocates in a housing 116 supported on a bracket 117 and drives a pinion 118 mounted in said housing and having a spline connection with the knife shaft 103.

The slide members 109 and 110 are hollow and have mounted therein a coil spring 120 held under compression between the ends of the slide members. A rod 121 is attached at one end to the slide member 109 and the opposite end of the rod extends freely through the outer end of the slide member 110, permitting relative movement of the slide members. The rod is provided with a head 122 to limit the expansion of the slide.

The operation of gathering a charge of glass in the mold and severing the charge is as follows: As the mold carriage rotates and the mold approaches the gathering pot, the cam 105 operates to draw the slide member 109 radially inward, such movement being effected by section 105ª (Fig. 5) of the cam. The slide member 110 is also moved radially inward by a section 106ª of the cam 106. Said inward movement of the slide member 109 operates through the rack bar 115 to rock the knife shaft 103 and thereby swing the plow 101 into operative position beneath the mold. As the mold is brought over the pool of glass the dip cam 84 operates to lower the mold to gathering position. The valve 94 is then opened by its cam 95 so that suction is applied and the charge of glass drawn into the mold.

The knife shaft is now swung in the reverse direction to withdraw the plow and cause the knife blade 104 to shear across the bottom plate 43ª or mouth of the mold and sever the gathered charge of glass from that in the pool. This is effected by means of a steep section 105ᵇ on the cam 105. When the cam roll 107 reaches the cam section 105ᵇ, the slide member 109 is given a quick outward movement by means of the coil spring 120 which is under compression. This swings the knife arm 102 outward to an intermediate position at which the knife blade 104 has severed the charge and is brought to rest in position to close the fill opening 43ᵇ. As the mold continues its travel, the cam roll 107 is brought to a cam section 105ᶜ by which the slide 109 is given a further outward movement, thereby swinging the plow and knife outwardly to the Fig. 6 position at one side of the mold.

The mold bottom plate 43ª is hinged to swing downward about the axis of a hinge pin 125 (Fig. 4). This movement of the bottom plate is under the control of a stationary cam 126 on the cam plate 86. The cam operates through the following mechanism. A cam roll 127 running on the cam is carried on a slide plate 128 mounted to reciprocate radially of the machine in guideways formed in brackets 129 attached to the framework of the mold carriage. A second slide plate 130 reciprocates in guideways in brackets 131 bolted to the dip frame 82 for up and down movement therewith. The slide plate 130 carries a depending pin 132 which extends downward into a socket 133 in the slide plate 128 and is movable up and down therein with the up and down movements of the dip frame. A rod 134 extending through a lug 135 on the slide plate 130 has operating connection with the mold bottom through a rock arm 136, rock shaft 137, rock arm 138, link 139, and a rock arm 140 on the hinge pin 125. A compression spring 141 mounted on the rod 134 holds the mold bottom in operative position with yielding pressure. After a mold has received its charge of glass and the plow and knife have been withdrawn, the cam 126 operates to swing the mold bottom downward to release the blank, permitting it to drop onto a spindle which has been brought into position as hereinafter described.

Spindle

Referring to Figs. 6, 7 and 13 to 15, the construction of the spindles will now be described. Each spindle 45 is mounted in a yoke or carrier 145 for rotation about its longitudinal axis and comprises an outer tubular casing 146 formed with elongated gear teeth 147 permitting the spindle to be rotated as hereinafter described. Within the casing 146 is a tubular member or sleeve 148 which is slidable up and down in the casing and formed at its upper end with a cup shaped head 149 with arms 150 fixed thereto and connected through links 151 to a pair of blank gripping jaws 152. The jaws are connected by pivots 153 to a cup 154 on the upper end of an inner sleeve 155. The inner and outer sleeves 155 and 148 are relatively movable lengthwise for opening and closing the jaws 152, the outer sleeve also having a limited lengthwise movement relative to the casing 146. The sleeve 148 extends about to the lower end of the casing 146 and has a collar 156 attached to its lower end. A coil spring 157 is held under compression between the collar 156 and a shoulder 158 on the casing. The inner sleeve 155 extends downward beyond the outer sleeve and casing and at its lower end carries a bearing block 160 in which it is journaled for rotation. A coil spring 161 mounted on the sleeve 155 is held under compression between the block 160 and a shoulder 162 formed in the outer sleeve 155. The relative up and down movement of the sleeves for opening and closing the spindle jaws is controlled by an arm 163 pivoted at 164 on the frame 145 and actuated as hereinafter described. The outer end of the arm 163 is bifurcated and carries rolls 165 adapted to engage beneath the block 160 and move the inner sleeve upward for opening the jaws.

Extending lengthwise through the spindle is a tubular plunger rod 166 carrying at its upper end a head or tip 167 adapted to be projected into the blank B for forming an initial blow opening therein. The plunger is held in its retracted position by a coil spring 168 on the plunger rod. The upper end of the spring bears against a packing gland 168a through which the plunger rod extends. The packing gland is connected to a blank holding cup 169 in which the plunger tip moves up and down. The cup 169 is nested within the cup 154 and is adapted for a small up and down movement relative thereto. The plunger is projected by means of a stationary cam 170 (Fig. 14) which engages a cylindrical head 171 having a swivel connection with the lower end of the plunger rod. Air for blowing the blank while carried on the spindle is supplied to the cylinder 171 through a flexible pipe 172 and is conducted through the tubular plunger rod to the blank.

*Spindle operating mechanism*

Each spindle unit (Figs. 6 to 14) comprises a vertical supporting frame or casting 175 having cast integral therewith a cylindrical casing 176 in which the spindle carrying drum 49 is mounted for oscillation about its horizontal axis to thereby oscillate the spindle. The plates 175 are connected to form an endless chain conveyor by an upper sprocket chain 177 and a lower sprocket chain 178, each chain made in short sections connecting adjacent plates 175. The spindle conveyor is trained over the blank mold carriage as before noted, the upper sprocket chain running on the sprocket plates 79 (Fig. 2) and the lower chain 178 running on sprocket segments 179, attached to the lower spider 75 of the mold carriage. The spindle conveyor also extends around the sprocket gears or rings 180 and 181 (Figs. 1, 20 and 21), on the burn-off carriage. Each plate 175 carries upper rolls 182 running on a stationary track 183 and lower rolls 184 running on a stationary track 185. The tracks 183 and 185 are carried on a framework 186 and extend in a straight line between the carriages, thereby supporting the spindle units during their travel between the carriages.

The drum 49 is formed at its forward end with the yoke or carrier frame 145 in which the spindle 45 is journaled for rotation about its axis. Means for rotating the spindle comprises a stationary rack 187 (Figs. 7 and 12) which drives a ring gear 188 mounted on the drum and formed with external gear teeth to engage the rack. The ring gear is also provided on its inner periphery with gear teeth for driving a pinion 189 keyed to a shaft 190 journalled within the drum. The shaft 190 has driving connection through beveled gearing 191 and shaft 192, with a train of gears 193, 194 and 195, the latter running in mesh with the gear teeth 147 on the spindle.

The rack bar 187 is carried on a stationary plate 196, the rack being positioned to effect rotation of the spindle during any desired portions of the travel of the spindle.

The means for oscillating the drum 49 includes a rack bar 197 (Figs. 7 and 9 to 11) fixed to a vertical plate 198 secured to the frame 175, and a rack bar 199 movable up and down on the plate 198. A pinion 200 carried on a slide block 201, runs in mesh with the rack bars 197, 199. The slide block carries a cam roll 202 running on a cam 203. The rack 199 drives a segmental gear 204 attached to the drum 49. The up and down movement of the slide block 201 operates through the racks and pinion to oscillate the drum, the double rack arrangement serving as a speed multiplying drive.

Means for moving the spindle lengthwise includes a cam 205 (Fig. 7) operating through the following mechanism. A rod 206 mounted in the drum for movement lengthwise thereof carries a cam roll 207 which runs on the cam 205. A slide plate 208 (Figs. 7 and 8) is also mounted within the drum for sliding movement lengthwise thereof. A pin 209 is mounted in the bifurcated end of a connector bar 210 attached to the rod 206. The pin extends through an elongated slot 211 in a lug 211a on the slide. A pair of latches 212 and 213 pivoted on the slide 208 are adapted to engage the opposite ends respectively of a stop plate 214 attached to the drum. The slide 208 has a link connection with one arm of a bell crank 215, the other arm of which is bifurcated to straddle the spindle and engages a collar 216 secured to the spindle casing 146.

As shown in Fig. 7, the cam 205 has moved the rod 206 outwardly and through its slot and pin connection with the slide plate 208 has moved the latter to the right, thereby operating through the bell crank 215 to lower the spindle. The latch 213 engages the end of the stop plate 214 when the spindle is lowered, thereby locking it in such position. When the rod 206 is moved in the reverse direction, namely, toward the spindle, the pin 209 releases the latch 213 while the lost motion is being taken up between the rod and the slide plate. Further movement of the rod operates to move the spindle upward and at the completion of this upward movement, the latch 212 engages the stop plate to hold the spindle in its lifted position.

Means for actuating the rock shaft 164 and rock arm 163 (Figs. 13 and 14) for opening the spindle jaws, includes a cam actuated rod 217 (Fig. 9) extending lengthwise through the spindle drum, the outer end of said rod being connected through a link 218 to a rock arm 219 (Figs. 7 and 9) on the rock shaft 164. The rod 217 is provided on its inner end with an elbow 220 carrying a cam roll 221.

Air under pressure is supplied to the spindles, as follows, for developing the blanks. Referring to Fig. 2, an air pressure chamber 222 in the stationary base plate 76 is in communication with an air chamber 223 in the plate 75 of the mold carriage. A pipe 224 leads from the chamber 223 to a valve chamber 225 (Fig. 3) in a valve casing 226. The valve in said casing is actuated by a rock arm 227 (Figs. 2 and 3) which runs on a stationary cam 228 carried on the column 41. When the valve is open it provides communication from the pressure pipe 224 to a tubular coupling member 229 mounted for lengthwise movement in the valve casing and projected outwardly by a coil spring 230.

Each spindle frame 175 (see Figs. 2 and 4) carries a coupling member 231 adapted to engage the coupling member 229 while traveling with the mold carriage around the column 41. The coupling 231 is mounted in a casing 232 in which is a ball check valve 233. A header pipe line 234 extends the entire length of the spindle conveyor and is at all times in communication with the air pressure chamber 222 through several of the valve couplings 229, 231. The cam 228 serves to open each valve 225 and hold it open while air connections are maintained therethrough with the header line, the valve being released before the coupling members are separated. Air lines from the header pipe 234 to the valves 236 (Fig. 7) include branch pipes 235 individual to the spindle units and each extending to an annular channel 235a (Figs. 8 and 7) in a bearing ring 235b in the drum casing. A passageway 235c (Fig. 8) leads from the annular channel to the valve 236 (Fig. 7). Each valve 236 is actuated at required intervals by cams 237 to supply air through the pipes 172 to the spindles for developing the blanks.

Transfer of blank to spindle

As before noted, each spindle 45 is swung to a horizontal position (Fig. 26) in which it is retained while passing beneath the gathering pot and is then swung to a vertical position and moved upwardly lengthwise (Fig. 13 and 27), thereby bringing it beneath and in register with a blank mold (Fig. 6). The arm 163 now engages beneath the head 160 and moves the inner sleeve 155 upward relative to the outer sleeve, thereby opening the jaws 152. The blank mold bottom 43a is then swung down, permitting the blank to drop onto the spindle. The arm 163 is then withdrawn, permitting the spring 161 to draw the inner sleeve downward and cause the jaws to grip the blank. The lever 215 then operates to lower the spindle so that the cylinder 171 engages with the cam 170 (Figs. 14 and 28), thereby projecting the plunger and forming an initial blow opening in the blank. The plunger is then withdrawn and as the spindle advances, it is swung to an inclined position (Fig. 29). Air is also admitted to the spindle under the control of the valve 236 (Fig. 7) and the spindle is at the same time rotated, thereby expanding and developing the blank in the open air in a conventional manner. Thereafter the spindle is swung downward to its fully inverted position (Fig. 30) and then moved into the finish blow mold 50 which closes about the blank which is then blown therein to finished form.

Finishing mold operating and conveying mechanism

Referring to Figs. 16 to 19 inclusive, a finishing mold unit will now be described. Each unit includes a carrier comprising a vertically disposed plate 240 having upper and lower rolls 241 and 242 respectively running on an upper track 243 and a lower track 244, said tracks serving to support and guide the carrier during a straight line travel. The carriers are connected by upper and lower chains 51a and 51b to form the endless conveyor 51 which, as before noted, is trained over the sprocket gears 52 and 53 (Fig. 1).

Each finishing mold 50 comprises partible sections supported on a bottom plate 245 and mounted to swing about a hinge pin 246 for opening and closing the mold. These movements of the mold are under the control of a stationary cam 247 on which runs a cam roll 248 on one section of a sectional slide 249 mounted to reciprocate in guides 250 on the carrier. A yielding connection is provided between the sections of the slide by coil springs 251 mounted on a rod 252 extending through lugs 253 on said sections. The slide is connected through a yoke 254 and links 255 to the mold arms. The bottom plate 245 is adjustable up and down for adjusting the mold to different heights. The adjusting means may be conventional and as shown includes an adjusting screw 256 attached to the bottom plate and movable up and down freely in the carrier frame. A worm wheel 258 rotated by a worm on a hand operated worm shaft 257 moves the screw shaft up and down and with it the bottom plate.

When the blank has been enclosed in the mold (Figs. 18 and 31) air under pressure is supplied to the spindle for blowing the blank in the mold while the latter is in register with the spindle and advancing toward the burn-off mechanism. When the final blowing of the blank is completed, the air supply is cut off and the finishing mold opened before the latter reaches the sprocket gear 53, thereby leaving the blown article (herein shown as a tumbler T) depending from the spindle (Fig. 32). As the spindle continues its travel toward the burn-off mechanism, it is at the same time moved upward to permit the tumbler to be brought over the burner 58 and is then lowered to position the tumbler in the burner (Fig. 33).

Burn-off mechanism

Referring to Figs. 20 to 22, the burn-off mechanism comprises an annular series of burn-off units 57 mounted on the carriage 47. Each unit comprises a ring burner 58 which may be of conventional construction mounted for rotation in the outer end of a radially disposed arm or supporting plate 57a having a fixed mounting on the carriage 47. The means for rotating the burners includes a ring gear 259 bolted to a stationary plate or hub 260 on the column 48. The gear 259 drives an idler pinion 261 which transmits motion to a gear 262 on a shaft 263 carried on the plate 57a. A sprocket chain 264 runs on sprocket wheels on the shaft 263 and a stub shaft 265 journaled in the plate 57a. The shaft 265 has keyed thereon a gear 266 running in mesh with a ring gear 267 on the ring burner 58. As the carriage rotates, motion is imparted through the gearing just described for rotating the burner.

Gases for the burners are supplied by the following means. The hub 260 is provided with an annular chamber 268 to which fuel gas is supplied through a pipe 269. A pipe 270 supplies oxygen or other combustion supporting gas to a similar chamber 271. A vacuum chamber 272 for a purpose hereinafter described is exhausted through a pipe 273. Said chambers 268, 271 and 272 communicate respectively with chambers 274, 275 and 276 formed in a bottom plate of the carriage. The fuel gas chamber 274 communicates with the burners through pipe lines 277 (Figs. 21 and 22) individual to the burners, each said line including a hand valve 278. Pipe lines 279 lead from the chamber 275 to the burners and each line includes a valve 280 which is operated automatically by a cam 281. The valve is opened wide during the burn-off operations but is closed during the intermediate intervals so that only a pilot flame is maintained at the burner.

When a blown article has been lowered into the burner (Figs. 21 and 33), the latter operates to sever the article, permitting it to drop a short distance in a receiving cup or ring 282 which has been brought into position for this purpose in a manner presently to be described.

Article transfer mechanism

Referring to Figs. 20, 21 and 23 to 25, mechanisms individual to the burner units are provided for transferring the finished articles from the burners to a conveyor 285. Each transfer mechanism includes a pair of vertical rods 286 attached to and depending from the arm 57a. The lower ends of said rods are attached to the lower end of a bracket 287 also mounted on the under side of the arm 57a. A yoke 288 is formed with bearing sleeves 289 by which the yoke is mounted for up and down movement on the rods 286. The yoke is provided with a forward extension or bracket 290. Parallel links 292 and 292a are pivoted at their inner ends to the bracket 290 and at their outer ends are pivoted to lugs formed on the cylinder 291 of a piston motor. The article holding transfer cup 282 comprises separable sections carried on a pair of arms 293 pivoted at 294 on the motor casting. An adjusting screw 295 permits adjustment for articles of different sizes.

Within the motor cylinder 291 are pistons 296 with piston rods 297 to which are attached bars 298 extending inwardly over the motor cylinder. Pins 299 on the inner ends of said bars engage slots in the ends of the arms 293. A coil spring 300 under compression within the motor cylinder holds the pistons in their outward position and operates through the connections just described to hold the sections of the cup 282 together. The cup sections are separated by applying a partial vacuum within the motor cylinder and thus drawing the pistons inwardly against the expansive force of the spring. For this purpose a vacuum line 301 is extended from the vacuum chamber 276 (Fig. 20) to the motor cylinder. A valve 302 in the vacuum line is carried on the yoke 288 and when the yoke is moved downward as presently described, the valve strikes an adjustable stop 303 mounted on the bracket 287 and thereby opens the valve so that the air is exhausted from the motor cylinder 291 and operates the motor to separate the cup sections and release an article carried thereby.

The yoke 288 is moved up and down by means of a stationary cam 304 which operates through a bell crank 305 pivoted to the bracket 287. The bell crank is connected through a link 306 to the yoke. During the initial downward movement of the yoke, the links 292 and 292a retain their vertical position in which they are held by a coil spring 307 connected at one end to the yoke and at its other end to one arm of a bell crank 308 pivoted to the yoke. The other arm of the bell crank is connected through a link 309 to the outer end of a rock arm 310 on a rock shaft 311 to which the link 292 also has a fixed connection. As the yoke nears the limit of its downward movement a roll 312 (Figs. 21 and 23) on the bell crank 308 strikes a stop 313 so that the final downward movement of the yoke rocks the bell crank 308 and through the connections above described swings the parallel links downward to the dotted line position (Fig. 21). As the parallel links swing downward they rotate the motor cylinder 291 about its longitudinal axis through 90° so that the cup 282 carried therewith is swung about the axis of the motor. As a result the cup and the article held therein remain in upright position during the entire transfer operation. This operation of the transfer mechanism brings the article directly over and close to the conveyor 285. The vacuum motor then operates as above described to release the article to the conveyor. As this transfer operation takes place, the spindle 45 is lifted (Fig. 34) and as it continues its travel, the spindle jaws are opened, releasing the moil M and dropping it into a chute 314.

Modifications may be resorted to within the spirit and scope of my invention.

I claim:

1. Apparatus for forming glass articles, comprising a container for a pool of molten glass, an endless chain conveyor, blank holding units carried by the conveyor and each comprising a spindle, means for driving the conveyor and directing said spindles in a horizontal path extending beneath said container, suction gathering molds, means for causing said molds to travel over the container in a path substantially parallel with said spindle path and gather blanks of molten glass from the container while the spindles travel beneath the container, means for transferring the blanks to said spindles while the molds and spindles are traveling in parallel paths, and means cooperating with the said spindles for developing the blanks.

2. Apparatus for forming glass articles, comprising a container for a pool of molten glass, an endless conveyor, blank holding units carried by the conveyor, means for driving the conveyor and directing said units in a horizontal path extending beneath said container, a blank mold carriage, blank molds thereon, means for rotating the carriage about a vertical axis and causing the blank molds to travel in a circular path extending over the pool of glass, means for introducing charges of molten glass into the blank molds, the path of said blank holding units including an arc concentric with said circular path, each blank mold being arranged to travel in register with one of said units while the latter is traveling through a predetermined portion of said arc, and automatic means for transferring blanks from the molds to said units while in register therewith and traveling in said arc.

3. The combination of a container for molten glass, an endless chain conveyor arranged to travel in a horizontal path, means for driving the conveyor, spindles carried by said conveyor and arranged to travel beneath the said container, means for gathering charges of glass by suction from the container and forming blanks, means for transferring the blanks to the spindles, finishing molds, means for supporting the finishing molds independently of the spindle conveyor and causing them to travel in an endless path, and means for enclosing the blanks in the finishing molds and developing them therein while attached to and traveling with the spindles.

4. Apparatus for forming glass articles comprising a container for a pool of molten glass, an endless spindle conveyor arranged to travel in a horizontal closed path, spindles carried by the conveyor and arranged to pass beneath the container, means for rotating the spindles about horizontal axes, means for gathering charges of glass from the pool, said means for rotating the spindles being arranged to swing each spindle to a horizontally disposed position during its passage beneath the container and to swing it to an upright position after passing beyond the container, means for transferring the charges of glass to the spindles while the latter are in upright position, and means cooperating with the spindles for developing the blanks.

5. Apparatus for forming glass articles comprising a container for a pool of molten glass, an endless spindle conveyor arranged to travel in a horizontal closed path, spindles carried by the conveyor and arranged to pass beneath the container, means for rotating the spindles about horizontal axes, a mold carriage, means for rotating it about a vertical axis, blank molds on the carriage arranged to travel over said container, means cooperating with the blank molds for gathering charges of molten glass in the molds, means for swinging said spindles to horizontal position and holding them in said position during their travel beneath the said container for then swinging them to upright position, the spindles being arranged to travel beneath and in register with the blank molds after passing beyond the tank, and means for transferring blanks from the blank molds to the spindles while the molds and spindles are in register.

6. Apparatus for forming glass articles comprising a mold carriage, means for rotating the carriage about a vertical axis, an annular series of blank molds on the carriage and rotating therewith in a circular path, means for introducing charges of molten glass into the molds and forming blanks in the molds, an endless chain conveyor trained around the mold carriage and traveling in an elongated, closed path extending laterally beyond the carriage, a series of blank receiving units carried by said conveyor and traveling therewith in an elongated, closed path, a portion of which is an arc concentric with the circular path of the blank molds, said units being brought into register in succession with the blank molds while traveling around the mold carriage and after the blanks have been formed in the blank molds, and means for transferring the formed blanks from the blank molds to said units while said molds and units are in register and traveling along said concentric portion of their paths.

7. Apparatus for forming glass articles comprising a mold carriage, means for rotating the carriage about a vertical axis, an annular series of blank molds on the carriage, means for introducing charges of molten glass into the molds and forming blanks in the molds, an endless chain conveyor trained around the mold carriage and traveling in a path extending laterally beyond the carriage, a series of blank receiving spindles carried by the conveyor and brought into register in succession with the blank molds, means for transferring blanks from the blank molds to the spindles, and means cooperating with the spindles for developing the blanks.

8. The combination of a blank mold carriage, means for rotating it about a vertical axis, an annular series of blank molds on the carriage, means for introducing charges of molten glass into the molds for forming blanks, an endless spindle conveyor trained around the blank mold carriage, a series of spindles carried by said conveyor, means for driving the conveyor and causing each spindle to travel in register with a blank mold as it advances with the carriage, means for transferring blanks from the blank molds to the spindles, blow molds, means for causing the blow molds to travel in register with the spindles in a path laterally beyond the blank mold carriage, means for closing the blow molds about the glanks, and means for blowing the blanks in the blow molds.

9. The combination of a gathering tank to contain molten glass, a blank mold carriage, blank molds thereon, means for rotating the carriage about a vertical axis and causing the molds to travel over the tank, means cooperating with the molds for gathering charges of glass by suction while the molds are traversing the tank, an endless spindle conveyor extending around the axis of the mold carriage, spindles on said conveyor in a plane beneath that of the molds, means for driving the conveyor in synchronism with the rotation of the mold carriage and causing each spindle to register with a mold during a portion of its travel around the mold carriage, means for transferring the blanks from the blank molds to the spindles, and means for developing the blanks while carried by the spindles.

10. The combination of a gathering tank to contain molten glass, a blank mold carriage, blank molds thereon, means for rotating the carriage about a vertical axis and causing the molds to travel over the tank, means cooperating with the molds for gathering charges of glass by suction while the molds are traversing the tank, an endless spindle conveyor extending around the axis of the mold carriage, spindles on said conveyor in a plane beneath that of the molds, means for driving the conveyor in synchronism with the rotation of the mold carriage and causing each spindle to register with a mold during a portion of its travel around the mold carriage, means for transferring the blanks from the blank molds to the spindles, means for developing the blanks while carried by the spindles, and means for swinging each spindle to a horizontal position for passage beneath the tank and to an upright position after passing the tank for receiving a blank.

11. Apparatus for forming hollow glass articles comprising a blank mold carriage, an annular series of blank molds thereon, means for rotating the carriage about a vertical axis, a series of spindle units each including a spindle, means connecting said units in the form of an endless conveyor, said conveyor extending around the axis of the mold carriage, means for driving said conveyor and causing the spindles to register with the molds during a portion of their travel, means for transferring blanks from the blank molds to the spindles, a series of blow molds, an endless chain conveyor by which the blow molds are carried, means for driving the blow mold conveyor and causing the blow molds to register with the spindles and travel therewith in a path positioned laterally beyond the blank mold carriage, and means for blowing the blanks in the blow molds while the blanks are carried on the spindles.

12. Apparatus for forming hollow glass articles comprising a blank mold carriage, an annular series of blank molds thereon, means for rotating the carriage about a vertical axis, a series of spindle units each including a spindle, means connecting said units in the form of an endless conveyor, said conveyor extending around the axis of the mold carriage, means for driving said conveyor and causing the spindles to register with the molds during a portion of their travel, means for transferring blanks from the blank molds to the spindles, a series of blow molds, an endless chain conveyor by which the blow molds are carried, means for driving the blow mold conveyor and causing the blow molds to register with the spindles and travel therewith in a path positioned laterally beyond the blank mold carriage, means for blowing the blanks in the blow molds while the blanks are carried on the spindles, the path of the blow molds being below that of the spindles, the path of the spindles being below that of the blank molds, and means for inverting each spindle after receiving a blank from a blank mold and before the blank is received in the blow mold.

13. Apparatus for forming hollow glass articles comprising a blank mold carriage, blank molds thereon, means for rotating the carriage about a vertical axis, a burn-off carriage, a series of burn-off units thereon, said burn-off carriage located laterally beyond the blank mold carriage, means for rotating the burn-off carriage, an endless conveyor extending in a closed path extending around the axes of said carriages, a series of blank receiving units carried by said conveyor, means for transferring blanks from the blank molds to said receiving units, means for blowing the blanks, and means cooperating with the burn-off units for severing the blown articles from the moil while carried by said blank receiving units.

14. The combination of a blank mold carriage, a burn-off carriage at one side thereof, means for rotating said carriages about vertical axes, blank molds on the blank mold carriage, burn-off units on the burn-off carriage, an endless chain conveyor trained around said carriages, means carried by said conveyor for receiving blanks from the blank molds and transferring them to the burn-off units, and means for blowing the blanks during said transfer.

15. The combination of a blank mold carriage, a burn-off carriage at one side thereof, means for rotating said carriages about vertical axes, blank molds on the blank mold carriage, burn-off units on the burn-off carriage, an endless chain conveyor trained around said carriages, means carried by said conveyor for receiving blanks from the blank molds and transferring them to the burn-off units, means for blowing the blanks during said transfer, said last mentioned means comprising a series of blow molds, an endless conveyor on which the blow molds are carried, and means for driving the blow mold carrying conveyor in a closed path arranged to cause the blow molds to travel with the blanks during the blowing operation.

16. Apparatus for forming hollow glass articles comprising an endless conveyor, spindles thereon, means for driving the conveyor, means for forming blanks and transferring them to the spindles, means for blowing the blanks to finished form while carried on the spindles, and burn-off mechanism for severing the blown articles from the moil while the latter is carried by the spindle.

17. The combination of a suction gathering mold open at its lower end, a mold bottom having a fill opening, means for swinging the mold bottom about a horizontal axis into and out of operative position beneath the mold, a plow, and means to swing the plow laterally into and out of register with the mold bottom, said plow constructed and arranged to direct molten glass upwardly into the mold.

18. The combination of a suction gathering mold open at its lower end, a rock shaft, a rock arm thereon, a plow fixed on the rock arm, means for rocking said shaft and thereby swinging the plow into and out of register with the mold, and a knife carried by the rock arm and secured in fixed position thereon, said knife arranged to shear across the bottom of the mold when the plow is withdrawn.

19. The combination of a mold carriage, a suction gathering mold thereon, means for rotating the carriage and causing the mold to traverse a pool of molten glass, a rock shaft on the carriage, a rock arm on said shaft, a knife carried by the rock arm arranged to shear across the mold, a sectional slide mounted on the carriage and comprising relatively movable sections, stationary cams, cam rolls carried by said sections and running on the cams, and operating connections between said slide and the rock shaft.

20. The combination of a mold carriage, a suction gathering mold thereon, means for rotating the carriage and causing the mold to traverse a pool of molten glass, a rock shaft on the carriage, a rock arm on said shaft, a knife carried by the rock arm arranged to shear across the mold, a sectional slide mounted on the carriage and comprising relatively movable sections, stationary cams, cam rolls carried by said sections and running on the cams, operating connections between said slide and the rock shaft, and a spring arranged to be placed under compression by relative movement of said slide sections, one of said cams having a steep section arranged to permit a quick rotation of the rock shaft under the influence of said spring.

21. The combination of a mold carriage, means for rotating it about a vertical axis, a dip frame mounted for up and down movement on the mold carriage, a mold carried by the dip frame, a mold bottom plate connected by a horizontal pivot to the mold, means for moving the dip frame up and down on the carriage for lifting and lowering the mold, a stationary cam, a slide plate on the mold carriage actuated by said cam, a second slide plate on the dip frame and operatively connected to said first slide plate, said connection permitting up and down movement of the second slide plate with the dip frame, and operating connections between said second slide plate and the mold bottom for swinging the latter about said pivot.

22. The combination of means for supporting a blank, means for blowing the blank to form a hollow article, and burn-off mechanism for severing the article from the moil, said mechanism comprising a burner carriage mounted for horizontal rotation, an arm extending radially from the carriage, a ring burner mounted at the outer end of said arm, a stationary rack concentric with the carriage, and a gear train carried by said arm and extending from the rack to the burner for rotating the burner about its axis as the carriage rotates.

23. The combination of an endless conveyor, spindles carried thereon, a carriage mounted for rotation about a vertical axis, said conveyor trained around said carriage, means for rotating the carriage and conveyor, ring burners on the carriage brought into register with the spindles as the carriage rotates, and means for moving each spindle lengthwise while in register with a ring burner and thereby introducing a blown article carried by the spindle into the burner and causing the burner to sever the article from the moil.

24. The combination of a spindle, means for attaching a blank thereto, means for blowing the blank to hollow form while carried by the spindle, a ring burner, means for positioning the blown article in the burner and causing the latter to sever the article from the moil, and mechanism for receiving the severed article and transferring it from the burner, said transfer mechanism comprising a sectional holding cup, a pair of vertically disposed parallel links, a cup holding device connected to the upper ends of said links and holding the cup in upright position, and means for swinging the parallel links downward to a horizontal position and for simultaneously swinging said cup support relative to said arms and thereby maintaining the cup and article carried thereby in an upright position while being lowered away from the burner.

25. Apparatus for forming hollow glass articles comprising a blank mold carriage, blank molds thereon, means to rotate the carriage, an endless chain spindle conveyor separate from the mold carriage, spindles thereon, means for driving said conveyor and spindles in an elongated path which is in part concentric with the mold carriage and causing the spindles while traveling in said concentric part of their path to register with the blank molds, means for transferring blanks from the molds to the spindles while the molds and spindles are in register, an air pressure chamber on the mold carriage, and means by which air under pressure is directed from said chamber to the spindles for blowing the blanks.

26. Apparatus for forming hollow glass articles comprising a blank mold carriage, blank molds thereon, means to rotate the carriage, a series of spindle units, each comprising a spindle, an endless conveyor carrying said units and extending around the axis of the mold carriage, means for driving said conveyor and causing the spindles to travel in a closed path in which each spindle is brought periodically into register with a mold, means for transferring blanks from the molds to the spindles, means for blowing the blanks to hollow form while carried on the spindles, said blowing means including an air pressure chamber on the mold carriage, an air pressure pipe line extending along the endless conveyor and carried therewith, and means for maintaining the pressure chamber in continuous communication with said pipe line.

27. Apparatus for forming hollow glass articles comprising a blank mold carriage, blank molds thereon, means to rotate the carriage, a series of spindle units, each comprising a spindle, an endless conveyor carrying said units and extending around the axis of the mold carriage, means for driving said conveyor and causing the spindles to travel in a closed path in which each spindle is brought periodically into register with a mold, means for transferring blanks from the molds to the spindles, means for blowing the blanks to hollow form while carried on the spindles, said blowing means including an air pressure chamber on the mold carriage, an air pressure pipe line extending along the endless conveyor and carried therewith, and means providing communication between the pressure chamber and said pipe line including coupling members on the mold carriage and mating coupling members on the endless carrier periodically brought into register with the first mentioned coupling members.

28. Apparatus for forming hollow glass articles comprising a series of blank molds, a carrier therefor, means for driving the carrier and causing the blank molds to travel in a horizontal closed path, means for introducing charges of molten glass into the molds and forming blanks therein, a spindle carrier, a series of spindles carried thereby, means for driving the spindle carrier and causing the spindles to travel in an elongated closed path located in part beneath and in part laterally beyond the path of the blank molds, means for synchronizing the movements of said carriers and causing the spindles to travel in register with the blank molds a predetermined distance with the spindles held in upright position, means for transferring the blanks from the blank molds to the upright spindles, means for inverting the spindles and causing them to travel a predetermined distance while inverted and with the blanks depending therefrom, a blow mold carrier, a series of blow molds thereon, means for driving the blow mold carrier and causing the blow molds to travel horizontally in a path below the spindles and causing the blow molds to travel in register with the inverted spindles while the spindles are in said part of their path beyond that of the blank molds, and means for blowing the blanks in the blow molds during said travel of the blow molds in register with the spindles and while the blanks are carried by the inverted spindles.

29. Apparatus for forming hollow glass articles comprising a series of blank molds, means for causing the blank molds to travel in a horizontally disposed closed path, a series of spindles, means for causing the spindles to travel in a closed path extending beneath the path of the blank molds, a series of finishing molds, means for causing the finishing molds to travel in a closed path extending beneath the path of the spindles, the path of the spindles extending laterally beyond the path of the blow molds, means for swinging the spindles from an upwardly projecting position to a depending position, means for transferring blanks from the blank molds to the upwardly projected spindles, means for blowing the blanks in the blow molds while the spindles are in said depending position, and burn-off mechanism cooperating with the spindles for burning off the blown articles from the moil after the spindles have passed beyond the path of the blow molds.

CLARE B. SHILLINGER.